Figure 12:
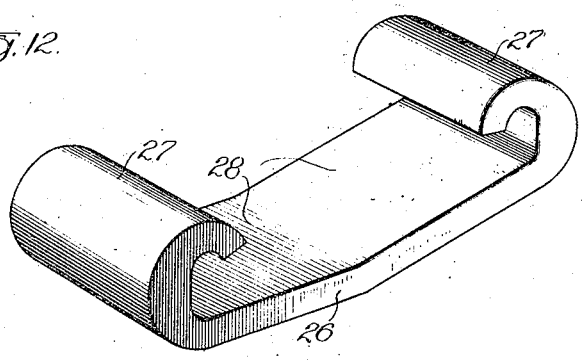
Figure 16:
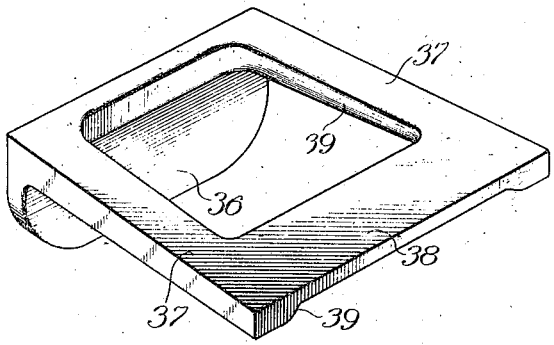
Figure 17:
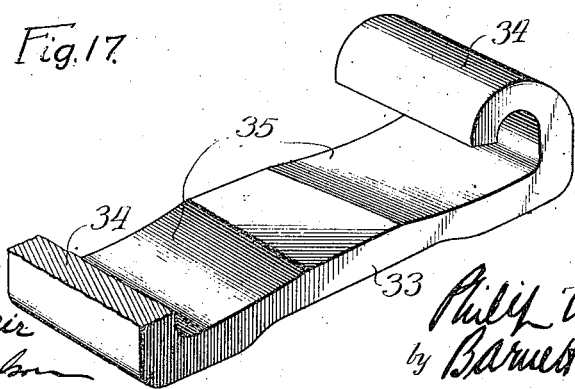

P. W. MOORE.
RAIL ANCHOR.
APPLICATION FILED DEC. 15, 1913.
1,128,348.
Patented Feb. 16, 1915.
4 SHEETS—SHEET 1.
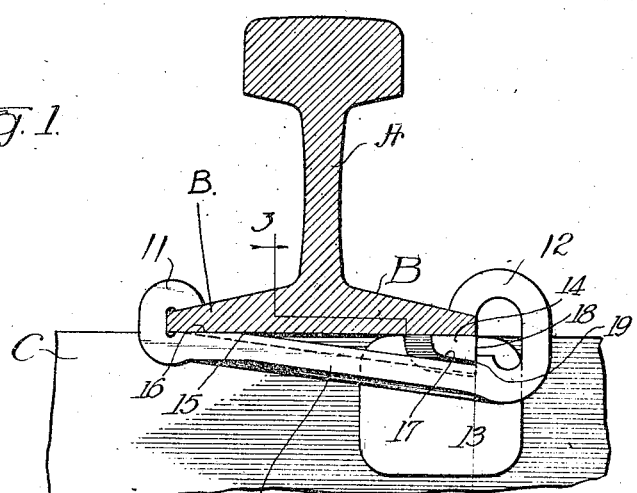
Fig. 1.
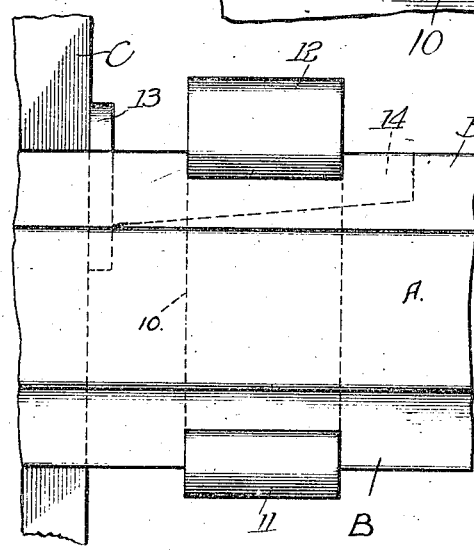
Fig. 2.
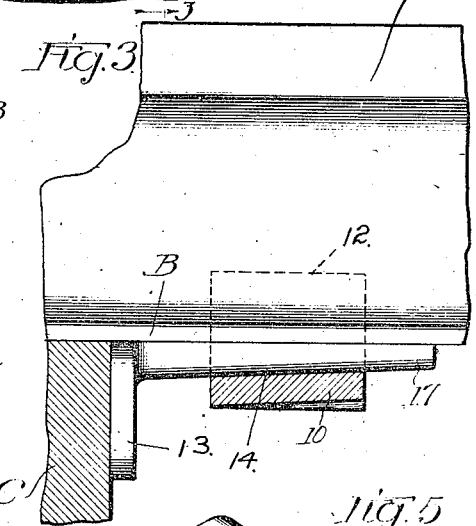
Fig. 3.
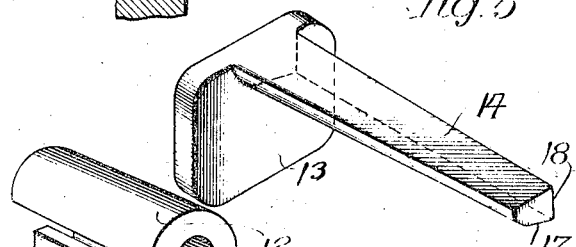
Fig. 4.    Fig. 5.
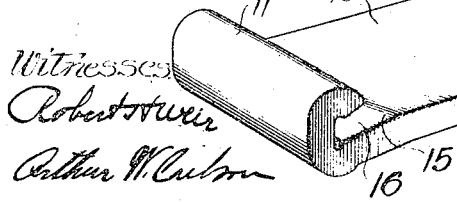
Witnesses
Robert Weir
Arthur W. Culson
Inventor
Philip W. Moore
By Barnett & Truman
Attys.

P. W. MOORE.
RAIL ANCHOR.
APPLICATION FILED DEC. 15, 1913.
1,128,348.
Patented Feb. 16, 1915.
4 SHEETS—SHEET 2.
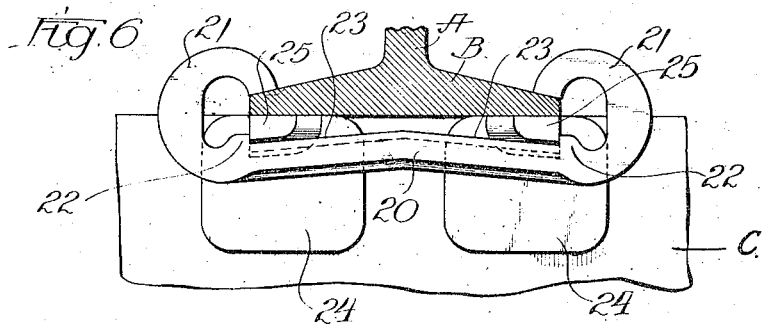
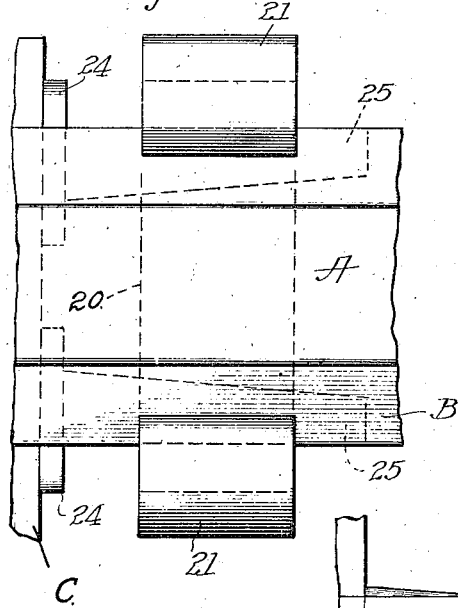
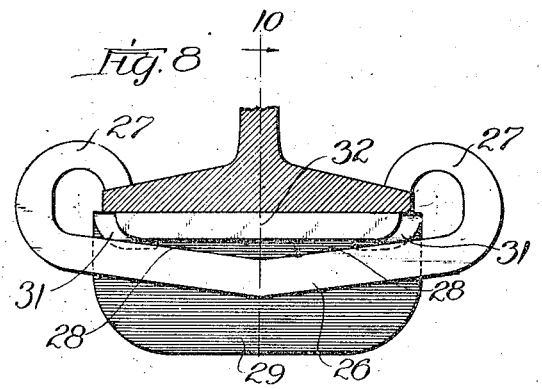
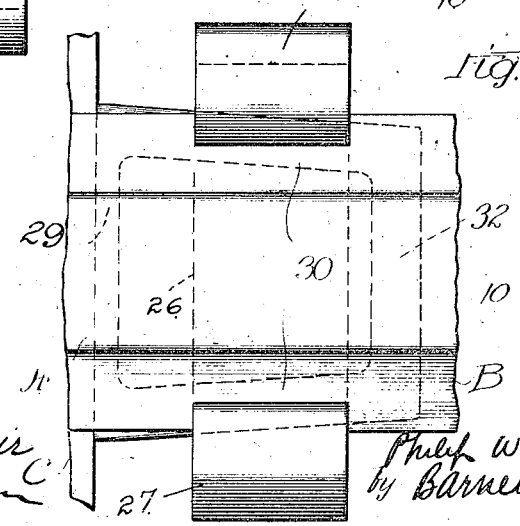

P. W. MOORE.
RAIL ANCHOR.
APPLICATION FILED DEC. 15, 1913.
1,128,348.
Patented Feb. 16, 1915.
4 SHEETS—SHEET 3.
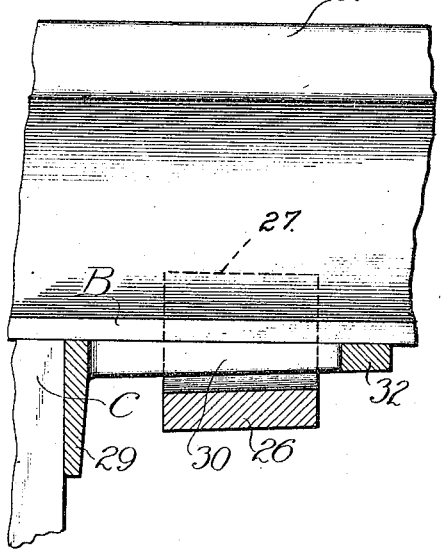
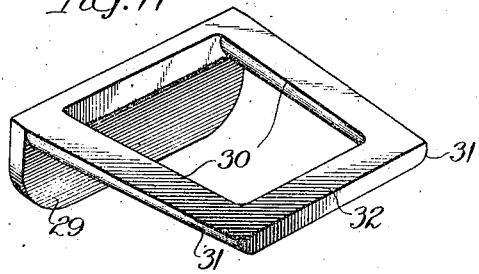
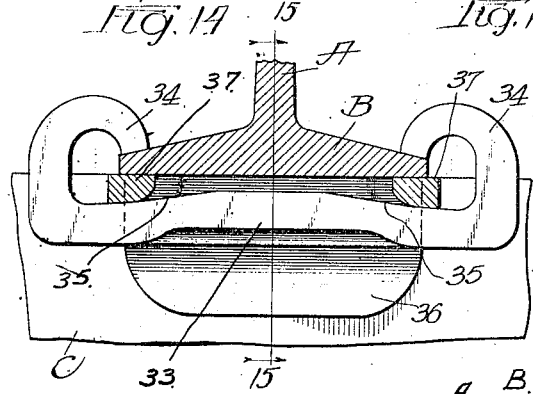
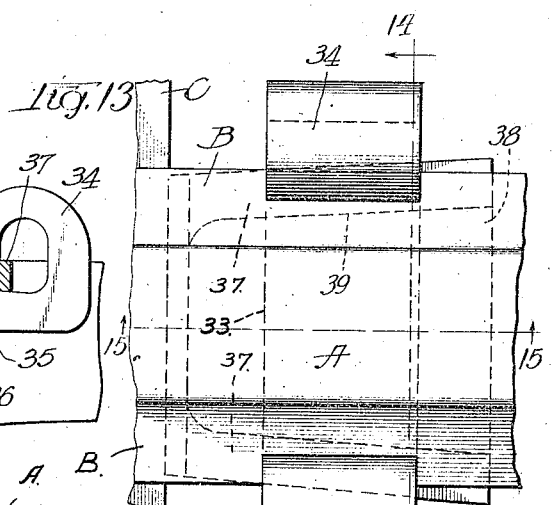
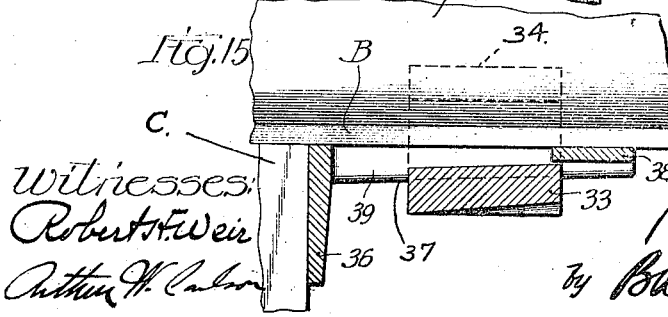

P. W. MOORE.
RAIL ANCHOR.
APPLICATION FILED DEC. 15, 1913.

1,128,348.

Patented Feb. 16, 1915.
4 SHEETS—SHEET 4.

Witnesses:
Robert H. Weir
Arthur W. Carlson

Inventor
Philip W. Moore
by Barnett & Truman
attys

UNITED STATES PATENT OFFICE.

PHILIP W. MOORE, OF EVANSTON, ILLINOIS, ASSIGNOR TO THE P. & M. CO., OF CHICAGO, ILLINOIS, A CORPORATION OF ILLINOIS.

RAIL-ANCHOR.

1,128,348.

Specification of Letters Patent. Patented Feb. 16, 1915.

Application filed December 15, 1913. Serial No. 806,773.

*To all whom it may concern:*

Be it known that I, PHILIP W. MOORE, a citizen of the United States, residing at Evanston, in the county of Cook and State of Illinois, have invented certain new and useful Improvements in Rail-Anchors, of which the following is a specification.

My invention relates to rail anchors or devices for preventing the longitudinal creep of railroad rails, and particularly to the type of anchor composed of a rigid or relatively rigid clip or shoe extending around the base flange of the rail to be anchored, and of a wedge carrying element provided with a wedging part interposed between said clip or shoe and the bottom of the rail, and with a tie abutting part which bears against one of the ties on which the rail is laid, or some other stationary, or relatively stationary, part of the roadbed; the engagement of the wedge and shoe providing a clamp which grips the rail base, and the tie abutting part or flange performing the function of holding said clamp, and hence the rail, in a fixed position against the tendency of the rail to creep forward in the direction of the travel of the trains.

My invention has for a primary object to provide certain novel constructions and arrangements in a rail anchor of this type whereby the danger of the base flange of the rail being broken or injured by the stresses exerted against it by the anchor is obviated, whereby the relatively movable parts composing the anchor are held more firmly and accurately in the desired coengagement, and whereby, for the reasons which will be made apparent in the following description, the anchor is in other respects more effective and reliable than rail anchors of this general type which have been heretofore devised.

The invention consists in the novel and improved constructions, arrangements and combinations which will be hereinafter described and claimed.

The invention is illustrated, in certain preferred embodiments, in the accompanying drawing wherein—

Figure 1 shows, in side elevation, applied to a rail, with the rail in section, a rail anchor illustrating one form of my invention. Fig. 2 is a plan view of the parts shown in Fig. 1. Fig. 3 is a sectional view taken on line 3—3 of Fig. 1 but showing the rail in elevation. Figs. 4 and 5 are views, in perspective, of the two parts constituting the anchor. Fig. 6 is a view similar to Fig. 5 showing a modified form of the invention employing two wedge members instead of one. Fig. 7 is a plan view of the parts shown in Fig. 6. Fig. 8 is a view similar to Figs. 1 and 6 illustrating another modification in which a single fixed tie abutting member is provided with two wedges one under each edge of the rail base. Fig. 9 is a plan view of the parts shown in Fig. 8. Fig. 10 is a sectional view taken on line 10—10 of Fig. 8. Fig. 11 is a view, in perspective, of the fixed or stationary element of the anchor shown in the preceding three figures. Fig. 12 is a view, in perspective, of the other element of this anchor. Fig. 13 is a plan view illustrating another modification in which the wedging members of the fixed element converge in the direction of the tie instead of diverging as in the form of the invention shown in Figs. 8 to 12 inclusive. Fig. 14 is a sectional view taken on line 14—14 of Fig. 13. Fig. 15 is a sectional view taken on lines 15—15 of Figs. 13 and 14, and Figs. 16 and 17 are views, in perspective, of the elements constituting the anchor shown assembled in Figs. 13 to 15 inclusive, the hook or jaw portion at one end of the element shown in Fig. 17 being broken away for the purpose of making the construction of this element more apparent.

Like characters of reference designate like parts in the several figures of the drawings.

Throughout the drawings A designates a railway rail having the usual base flange B, and C one of the ties on which the rail is supported.

The rail anchor shown in Figs. 1 to 5 inclusive, consists of two coacting elements, one of which extends under the rail and has its extremities so formed as to bear against the upper surfaces of the base flange at opposite sides of the rail, the other of which has a wedging member or part which intervenes between the first named element and the base flange of the rail, and a part adapted to hold the anchor in a stationary position as, for example, by bearing against the cross tie C. The first named element (Fig. 4) consists preferably of a bar 10 provided at one end with a hook 11 and at the other with a larger hook 12. The other member consists preferably of a plate 13 adapted to bear against the tie C from which plate projects a wedge 14. The bar 10 is bent along the oblique line 15 so as to provide a footing 16 for one edge of the base flange B of the rail which is directly under the hook 11 and so as to provide also a space for the wedge 14 between the other end of the bar and the opposite edge of the base flange of the rail. The main portion of the bar 10 therefore slopes, or is inclined, both transversely with respect to the plane of the bottom of the rail base flange and also longitudinally with respect thereto. The under surface 17 of the wedge 14 is by preference correspondingly inclined. The wedge member 14 has a vertical face 18 which bears against the inner face of a rib 19 on the bar 10. In adjusting the anchor to the rail the plate 13 is placed against the tie C and the shoe element is slipped under the rail with its hooks 11 and 12 overlapping opposite edges of the base flange B. By driving the shoe member toward the tie, a wedging engagement is brought about between the shoe or movable element and the wedge 14 of the stationary element. It will be observed that the wedge 14 is directly beneath the extremity of hook 12 so that when the parts of the anchor are driven together there is no tendency to break out the edge of the rail base. On the other side of the rail the wedge is held between the hook 11 and the footing 16. Any tendency on the part of the rail to creep forward is self checked since it involves a closer wedging engagement between the base flange of the rail and the parts constituting the anchor. The wedge 14 is firmly held between the inclined upper face of the bar 10, the lower surface of the base flange of the rail and the rib 19.

Figs. 6 and 7 show a modification involving the use of a wedge at each side of the anchor. The bar 20 of the movable element is bent downwardly on each side of its longitudinal center line and is formed with similar hooks 21 at opposite ends and with similar ribs 22, the upper surfaces 23 of the bar sloping downwardly toward the tie as well as transversely. There are two stationary elements consisting, in the form of the invention shown, each of a tie abutting plate 24 and a wedge 25.

In the form of the invention shown in Figs. 8 to 12 inclusive, the anchor is composed of a movable element and a single stationary element, the latter, however, providing two wedge members one under each edge of the rail. The bar 26, which is provided at opposite ends with hooks 27, is formed with two inclined faces 28 which slope downwardly from the hooks to the center of the bar and also downwardly from the edge remote from the tie toward the tie. The other member consists of a tie abutting plate 29 formed with wedge members 30, provided with the wedging faces 31, connected at the outer ends by the integral cross piece 32, the wedge members diverging in the direction toward the tie and being tapered from the plate 29 toward the cross piece 32 and the wedging faces 31 inclined so as to coact with the inclined surfaces 28 on the bar 26.

Figs. 13 to 17 inclusive show another modification. The movable element in this construction consists of a bar 33 provided at opposite ends with hooks 34 and formed with inclined surfaces 35 sloping downwardly toward the tie and downwardly from the middle of the bar toward its extremities. The stationary element consists preferably of a tie abutting plate 36 and a pair of wedge members 37 which converge and increase in their vertical dimension in the direction toward the tie, these members being preferably connected at their outer ends by a cross piece 38 and being formed with wedging faces which coact with the surfaces 35 of the bar.

While I have described my invention in certain preferred embodiments it will be obvious that modifications might be made without departure from the principle of the invention. Therefore I do not wish to be understood as limiting the invention to the precise constructions, arrangements and proportions shown.

I do not claim specifically herein the constructions shown in Figs. 8 to 17 inclusive, the form of invention shown in Figs. 8 to 12 inclusive being specifically claimed in my co-pending application Serial No. 865,087, filed October 5, 1914, and the form of the invention shown in Figs. 13 to 17 inclusive, being specifically claimed in my co-pending application Serial No. 865,088, filed October 5, 1914, both of which applications are divisions of the present application.

I claim:

1. In a rail anchor, the combination with a movable element adapted to engage opposite sides of the base flange of the rail and formed at one end so as to overlap and bear upon the upper surface of said base flange, of a stationary element provided with a wedge member which is adapted to intervene between the movable element and the bottom of the rail directly under the part of said movable element overlapping said base flange, said movable element being formed with a rib against which the outer edge of said wedge member bears.

2. In a rail anchor, the combination with a movable element adapted to engage opposite sides of the base flange of the rail and formed at one end so as to overlap and bear upon the upper surface of said base flange, of a stationary element provided with a member which is adapted to intervene between the movable element and the rail directly under the part of said movable element overlapping said base flange, the portion of said movable element under the base flange and member being formed with two pairs of coacting wedge faces which stand at an angle to each other.

3. In a rail anchor, the combination with a movable element adapted to engage opposite sides of the base flange of the rail and formed at one end so as to overlap and bear upon the upper surface of said base flange, of a stationary element provided with a member which is adapted to intervene between the movable element and the rail directly under the part of said movable element overlapping said base flange, said movable element and member being formed with co-engaging faces oblique with respect to the plane of the bottom of the base flange and said movable element with a rib which bears against said member.

4. In a rail anchor, the combination with a bar formed with hooks at opposite ends adapted to bear upon the upper surfaces of the base flange of the rail on opposite sides thereof, of a tie abutting plate formed with a member adapted to intervene between said bar and the bottom of the rail, said member and bar being formed with two pairs of coacting wedge faces, the faces of one pair being oblique to the plane of the bottom of said base flange both longitudinally and transversely of the rail.

5. In a rail anchor, the combination with a bar formed with hooks at opposite ends adapted to bear upon the upper surfaces of the base flange of the rail on opposite sides thereof, of a tie abutting plate formed with a member adapted to intervene between said bar and the bottom of the rail, said member and bar being formed with coacting wedge faces which are oblique to the plane of the bottom of the base flange both longitudinally and transversely of the rail and the bar being formed with a rib which bears against said member.

6. In a rail anchor, the combination with a bar formed at opposite ends with hooks adapted to bear against the upper surfaces of the base flange of the rail, of tie abutting means provided with separate wedge members under opposite edges of the base flange of the rail adapted to intervene between said bar and the bottom of the rail directly under said hooks.

7. A rail anchor comprising an element adapted to extend around the base flange of the rail and provided with overlapping parts adapted to bear against the upper surfaces of the base flange on opposite sides of the rail, and means providing wedges which extend under opposite edges of the base flange of the rail, said wedges and the element with which they are engaged being formed with coengaging surfaces which are oblique to the plane of the bottom of the base flange both longitudinally and transversely of the rail.

8. A rail anchor comprising an element adapted to extend around the base flange of the rail and provided with overlapping parts bearing against the upper surfaces of the base flange of the rail on opposite sides thereof, and tie abutting means provided with a pair of wedges which extend under opposite edges of the bottom of the rail, said wedges and the element with which they are engaged being formed with coengaging surfaces which are oblique to the plane of the bottom of the base flange both longitudinally and transversely of the rail.

9. In a rail anchor, the combination with a movable element adapted to engage opposite sides of the base flange of the rail and formed at one end so as to overlap and bear upon the upper surface of said base flange, of a stationary element provided with a wedge member which is adapted to intervene between the movable element and the bottom of the rail directly under the part of said movable element overlapping said base flange, said wedge member and the surface of the other element upon which it bears having an inclination with respect to the plane of the rail base both longitudinally and transversely thereof.

PHILIP W. MOORE.

Witnesses:
H. C. PARKER,
F. A. PRESTON.